Figure 1:
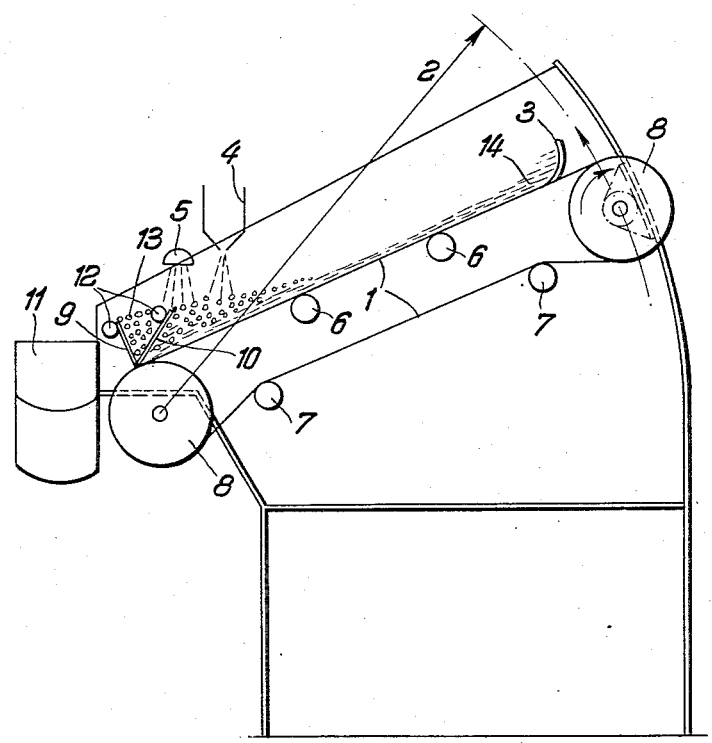

June 3, 1958      K. MEYER      2,836,846
APPARATUS AND PROCESS FOR GRANULATING MATERIAL
Filed Sept. 3, 1954      2 Sheets-Sheet 1

Inventor:
Kurt Meyer
By Bailey, Stephens and Huettig
Attorneys

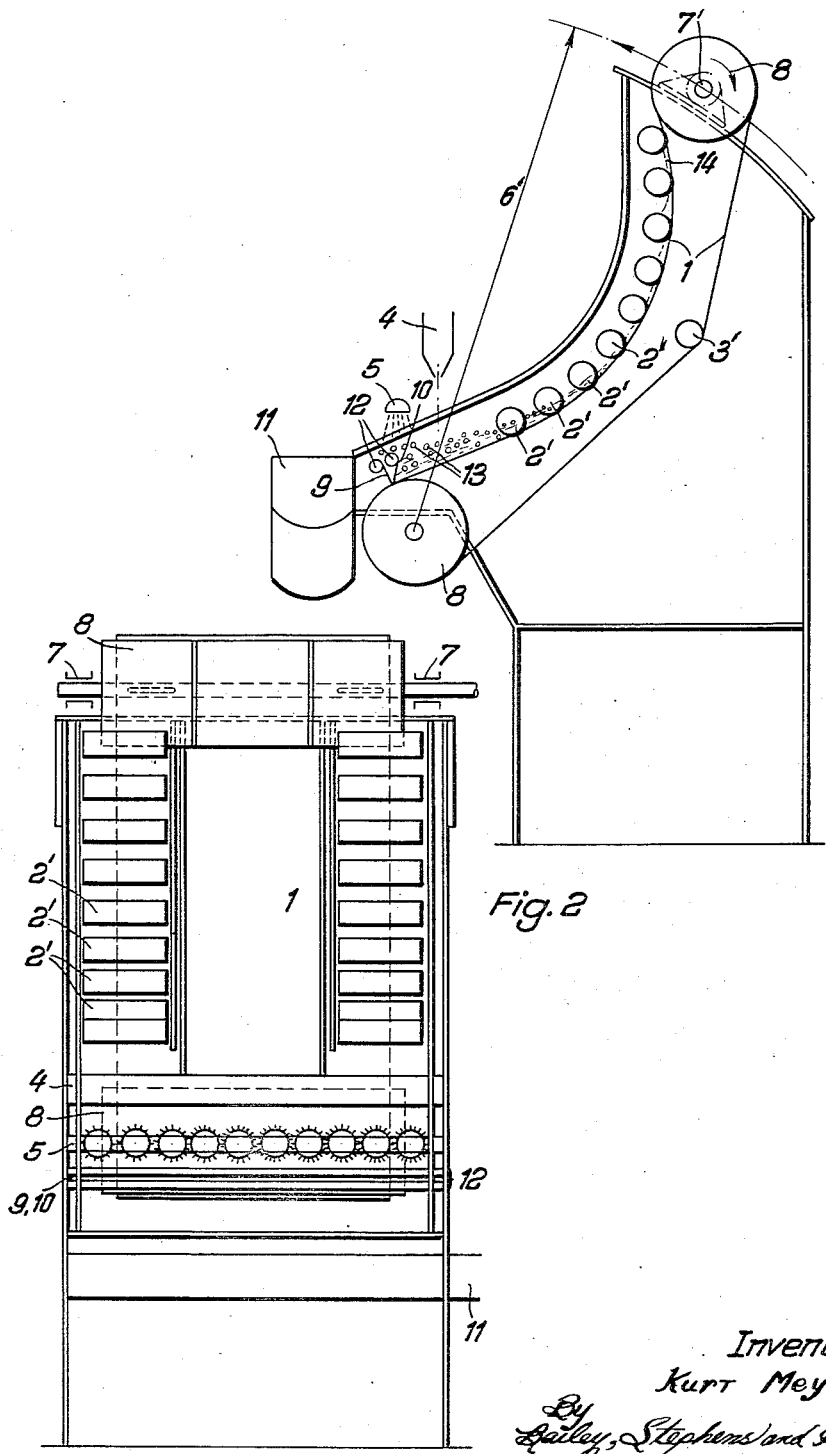

United States Patent Office 2,836,846
Patented June 3, 1958

2,836,846

APPARATUS AND PROCESS FOR GRANULATING MATERIAL

Kurt Meyer, Frankfurt am Main, Germany, assignor to Metallgesellschaft Aktiengesellschaft, Frankfurt am Main, Germany, a corporation of Germany Application September 3, 1954, Serial No. 454,170

Claims priority, application Germany February 24, 1954

8 Claims. (Cl. 18—1)

This invention relates to the formation of granules from powders or finely divided materials.

In many processes powdered or pulverized materials are first pellitized, or granulated, before they are used in the process. In one way the granulation is accomplished by keeping the powdered material in a rotary movement and adding water if the material is not already wet. The powdered material balls up into individual granules, the granulation being continued until granules of desired size are obtained. Granulation can also be produced in mixers such as shown in United States Eirich Patent No. 2,357,941, or in an extrusion press provided with suitable cutting means. This latter process is quite suitable for the granulation of plastic materials such as clay and the like, but it is not satisfactory for the granulation of clay-free materials such as sand.

The apparatus for the first two aforementioned granulating processes is for the most part composed either of flat dishes or discs, or drums. In such apparatuses satisfactory granules are obtained, even those composed of clay-free materials. The granulating disc is especially suitable for the production of uniform and dense granules.

However, both the granulating drums and discs have the disadvantage in that they require large amounts of floor space, and operating power, because only a small portion of the granulation surface is usable for the actual production of granules. Moreover, these apparatuses can only be fed with material to be granulated at one point on the granulating surface.

The objects of the instant invention are to produce an apparatus and process for the granulation of material in which the granules produced are as uniform and as dense as those made in prior machines, but which apparatus has a high effective area of granulating surface, and can be operated with less power than prior machines.

In general, these objects are obtained by using a moving endless inclined belt or band conveyor for the granulating surface. When the finely divided material is placed on the inclined surface, the angle of which is adjustable, the powdered material is carried along only so long as the angle does not exceed a certain degree. Above a specific angle the material begins to roll downwardly on the band and balls up into granules. Below an angle of about 22 degrees the rolling back effect ends for most powdered materials. As it is advantageous to have sufficient adhesion between the band and the material to be granulated, the surface of the band can also be artificially roughened or profilized.

Figure 1A:
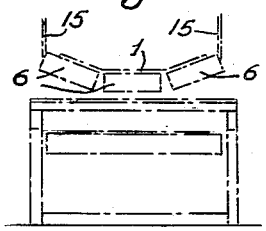

The means by which the objects of the invention are obtained are described more fully with reference to the accompanying drawings, in which:

Figure 1 is a diagrammatic cross-sectional view through the granulating apparatus; Figure 1a is a diagrammatically illustrated end view of Figure 1; Figure 2 is a cross-sectional view through a modified apparatus, and Figure 2a is a plan view of Figure 2.

The apparatus illustrated in Figures 1 and 1a is especially adapted for the granulation of raw cement powder. The granulating surface is the upper reach of endless belt or band 1, which is adjustable to a variable angle of inclination to the horizontal as illustrated by the line 2. The angle of inclination ranges between 30° and 70°. Adjacent the upper end of the belt 1 is a scraper 3 to prevent the powdered material from being carried over the upper end of the band. Hopper 4 deposits the material over the lower portion of the band. The material is moistened by sprinkler 5. Band 1 is supported by rollers 6 beneath the upper reach thereof, while the lower reach runs over tension rollers 7. The opposite ends of the belt are passed over the guide rollers 8 actuated by any conventional driving means. Mounted below the upper reach of the band is a wall or dam 9 which is for the purpose of preventing the granules from prematurely leaving the apparatus. As shown at 10 this wall may be inclined toward the upper end of the band so that it forms an acute angle therewith. This has been found to be particularly effective for obtaining an improved granulation in the granulating of many powders. As the completed granules spill over the walls 9 or 10, they fall into a conveyor 11 to be transferred to any desired place. To facilitate the discharge of the granules 13 a rotating roller 12 is mounted along the upper edge of walls 9 and 10 between the wall and conveyor 11. The powdered material 14 to be granulated can be introduced upon any portion of the upper reach of band 1, but preferably over the lower portion thereof. In order to prevent the material 14 from laterally falling off band 1, side walls 15 are provided along the longitudinal edges of the band. Alternatively, or at the same time, rollers 6 can be arranged to hold band 1 into a troughlike form as shown in Figure 1a.

In operation, if the speed of band 1 is set so that it corresponds approximately to the speed at which the granules will roll downwardly, the granulating effect takes place over the entire surface of the upper reach of the band. If the band speed is reduced so that it is slightly less than the speed the granules roll downwardly, the granules collect against the walls 9 and 10, and continue to ball up until they reach a desired size, and are not carried upwardly by the moving band. The band speed is from 1 to 5 m./sec., depending on the type of materials to be treated and the inclination of band 1. An angle of 32° and a band speed of about 1.20 m./sec., proves to be very satisfactory in the granulation of raw cement powder.

The band 1 can be elongated so that the granulation is performed in individual separated sections on the same belt, these sections being arranged in series and, if necessary, being connected with one another in such a manner that small granules are formed in the upper sections, and shaped to larger granules in the lower sections. It has been found that cores of the powdered material are readily formed in the lower portion of the band when the material is moistened, and these cores are formed into granules on further portions of the band. If the angle of inclination is about 32 degrees in the granulation of raw cement powder, the granules which are formed are not carried upwardly by the band but increased in size on the lower portion of the band. In order to insure that the most finely powdered particles on the upper part of the band will roll downwardly, the use of the scraper 3 is effective, or the angle of the upper portion of the belt can be increased.

In Figure 2, the apparatus of Figure 1 has been modified to show the progressive inclination of the belt. Otherwise the apparatus is substantially the same as shown in Figure 1. The band 1 extends over end rolls 8. However, the upper surface of the band has its outer edge portions held by rollers 2' to form a progressively increasing inclined surface. The lower reach of band 1 is held by tension roller 3' and the rolls 8 are driven by any suitable mechanism 7'. The angle of inclination of band 1 can be changed over a range indicated by line 6'. It is clear that in operation when the powdered material 14 is placed on band 1 it will be carried along until the granules 13 are formed, and that any finely divided powder will fall back by gravity if the angle of inclination of band 1 is increased towards the upper portion of the band. As illustrated, this angle can be increased at least to vertical to ensure that all the material will be dropped back.

It is apparent that the powdered material to be granulated can be deposited over a large portion of the band, and moistened, so that a more effective utilization of substantially all the surface of the band is used for producing granules. Again the apparatus can be operated with considerably less power than a granulating disc. For example, the granulating belts of Figures 1 and 2, having an effective granulating area of 8 square meters, required an operating power of only from about 6 to 8 kw., while a corresponding granulating disc having the same effective granulating surface required 45 to 50 kw.

Having now described the means by which the objects of the invention are obtained,

I claim:

1. An apparatus for forming finely divided materials into granules comprising an endless band, means for mounting said band with the upper reach thereof lying in an upwardly inclined plane for forming an upwardly moving granulating surface on the upper reach of said band upon which finely divided material is granulated while moving downwardly thereon, means for depositing finely divided material upon said band, and means for moistening said material, the depositing and moistening means, respectively, both being mounted above the lower portion of the upper reach of said band.

2. An apparatus as in claim 1, further comprising a damming wall mounted across the lower end of the upper reach of said band.

3. An apparatus as in claim 2, further comprising a rotatable discharge roller mounted adjacent the upper edge of said damming wall.

4. An apparatus as in claim 3, wherein said damming wall is inclined toward the upper end of said band.

5. An apparatus as in claim 4, wherein said upper reach of said band is inclined at an angle ranging between 30° to 70°.

6. An apparatus as in claim 5, further comprising wall means extending along the longitudinal edges of the upper reach of said band for confining the material being granulated to the upper surface of said band.

7. An apparatus as in claim 6, further supporting roller means for shaping the upper reach of said band into a trough.

8. An apparatus as in claim 1, further comprising means for progressively increasing the inclination of the upper reach of said band from the lower to the upper end thereof.

References Cited in the file of this patent

UNITED STATES PATENTS

| | | |
|---|---|---|
| 835,526 | Horn | July 25, 1908 |
| 987,325 | Sanner | Mar. 21, 1911 |
| 1,691,681 | Thomson | Nov. 13, 1928 |
| 2,446,660 | Mulkey et al. | Aug. 10, 1948 |
| 2,553,714 | Lucas | May 22, 1951 |

FOREIGN PATENTS

| | | |
|---|---|---|
| 627,047 | Germany | July 14, 1934 |